United States Patent
Palandre et al.

(10) Patent No.: US 7,426,427 B2
(45) Date of Patent: Sep. 16, 2008

(54) SYSTEM FOR CONTROLLING AND/OR REGULATING AN ELECTRIC MACHINE OF A MOTOR VEHICLE

(75) Inventors: Xavier Palandre, Munich (DE); Merten Jung, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/802,076

(22) Filed: May 18, 2007

(65) Prior Publication Data

US 2007/0257627 A1    Nov. 8, 2007

Related U.S. Application Data

(63) Continuation of application No. PCT/EP2005/011328, filed on Oct. 21, 2005.

(30) Foreign Application Priority Data

Nov. 20, 2004    (DE) .................. 10 2004 056 187

(51) Int. Cl.
    *B60K 35/00* (2006.01)
(52) U.S. Cl. ........................ 701/22; 180/197
(58) Field of Classification Search ............ 701/1, 701/22, 51, 70, 79, 36; 180/197; 303/168
    See application file for complete search history.

(56) References Cited

U.S. PATENT DOCUMENTS

| | | | | |
|---|---|---|---|---|
| 5,949,210 A | | 9/1999 | Gataric et al. | |
| 5,991,669 A | * | 11/1999 | Dominke et al. | 701/1 |
| 6,539,915 B1 | * | 4/2003 | Wild et al. | 123/295 |
| 6,672,085 B1 | | 1/2004 | Sangwan et al. | |
| 6,679,344 B1 | * | 1/2004 | Bertram et al. | 180/65.3 |
| 6,681,161 B1 | * | 1/2004 | Gordon et al. | 701/20 |
| 6,718,214 B1 | | 4/2004 | Schoettle et al. | |
| 6,725,134 B2 | * | 4/2004 | Dillen et al. | 701/19 |
| 2004/0195017 A1 | | 10/2004 | Braun et al. | |

FOREIGN PATENT DOCUMENTS

| | | |
|---|---|---|
| DE | 199 60 079 A1 | 6/2000 |
| DE | 103 01 531 A1 | 8/2004 |
| EP | 0 943 481 A2 | 9/1999 |

OTHER PUBLICATIONS

International Search Report dated Feb. 10, 2006 w/English translation (four (4) pages).
German Search Report dated May 19, 2005 w/English translation (six (6) pages).

* cited by examiner

*Primary Examiner*—Dalena Tran
(74) *Attorney, Agent, or Firm*—Crowell & Moring LLP

(57) ABSTRACT

A system for controlling and/or regulating an electric machine, particularly a crankshaft starter generator, of a motor vehicle is provided. The system has prioritization devices by which different priorities can be assigned to demands on the electric machine. Coordinating devices are provided for coordinating the prioritized demands. When several demands occur isochronously, the demand with the higher priority is, in each case, treated in a higher-ranking manner.

6 Claims, 3 Drawing Sheets

(State of the Art)

SYSTEM FOR CONTROLLING AND/OR REGULATING AN ELECTRIC MACHINE OF A MOTOR VEHICLE

CROSS-REFERENCE TO RELATED APPLICATIONS

This application is a continuation of PCT International Application No. PCT/EP2005/011328, filed on Oct. 21, 2005, which claims priority under 35 U.S.C. §119 to German Application No. 10 2004 056 187.7, filed Nov. 20, 2004, the entire disclosures of which are expressly incorporated by reference herein.

BACKGROUND AND SUMMARY OF THE INVENTION

The invention relates to a system for controlling and/or regulating an electric machine of a motor vehicle, particularly a system for controlling and/or regulating a machine, such as a crankshaft starter generator, which can be operated as a generator and, as required, additionally as a motor.

A new generation of generators is known, which permit an access to the generator by way of a desired voltage predefinition, as well as additionally by way of an exciting current limitation. As a result of the generator construction, either the desired voltage predefinition or the exciting current predefinition has priority here. This means that, in the event of isochronous demands at the input of the desired voltage predefinition and at the input of the exciting current predefinition, in each case, only one demand (here: the exciting current predefinition) is taken into account. For example, in the case of contrasting demands on the generator and a prioritized exciting current predefinition, this may lead to a conflict of goals. That is, in the case of an active exciting current predefinition, by which, for example, the exciting current can be limited and thus the reciprocal action of the generator on the internal-combustion engine is controlled (limited), an electric power demanded by the desired voltage predefinition cannot be made fully available (see FIG. 1).

Furthermore, from German Patent document DE 103 01 531 A1, a system and a method for operating an electric machine are known, whereby the disadvantageous influences upon the drive transmission line that may possibly occur as a result of the operation of the electric machine, and the possibly occurring negative influences on the onboard power supply of a motor vehicle are to be avoided. For this purpose, it is suggested that a torque command variable be formed for the torque demands of the drive transmission line and that a voltage command variable be formed for the voltage demands of the onboard power supply and the battery. The voltage command variable is limited by upper and lower torque limiting values. The torque command variable is limited by upper and lower voltage limiting values.

It is an object of the invention to provide a system for controlling and/or regulating an electric machine of a motor vehicle, which ensures an improved coordination of demands on the electric machine.

According to the invention, this object is achieved as a result of the coordination of demands on the electric machine by way of prioritization devices and the assurance of a higher-ranking treatment of the demand with the highest priority by way of coordination devices. An unambiguous precedence of the possible demands on the electric machine is defined and thus also a sequence in the event of simultaneously occurring demands which would represent a conflict of goals. An uncontrolled or even accidental meeting of demands with correspondingly unpredictable consequences is reliably avoided.

In a preferred embodiment of the invention, the prioritization devices are constructed as a stored table, in which preferably all demands on the electric machine contemplated in the system are stored with an assigned individual priority. As an alternative, it is also possible to determine the priority for each occurring demand online according to previously determined rules and to assign it to the demand. For this purpose, software devices are available, for example, by way of which a priority is assigned to each demand, particularly as a function of influence factors whose change has at least an indirect influence on the torque of the electric machine. In particular, prioritization takes place as a function of the charge condition of the battery and/or as a function of the currently existing torque differential of the electric machine (torque differential=maximal torque−currently set torque).

Advantageously, precisely one priority is assigned to each demand, each priority to be assigned also existing only once in the system. Therefore, no conflicts can occur as a function of equal-priority demands.

Additional advantageous embodiments are described and claimed herein.

Other objects, advantages and novel features of the present invention will become apparent from the following detailed description of the invention when considered in conjunction with the accompanying drawings.

DETAILED DESCRIPTION OF THE DRAWINGS

Figure 1:
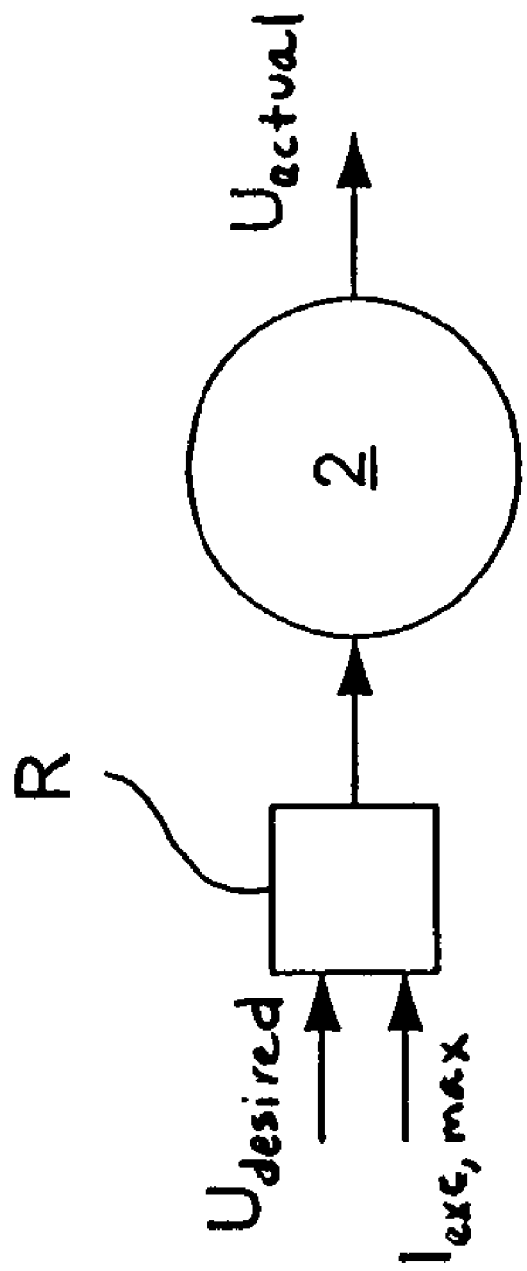
FIG. 1 is a schematic diagram of a generator together with a pertaining automatic controller unit according to the state of the art.
Figure 2:
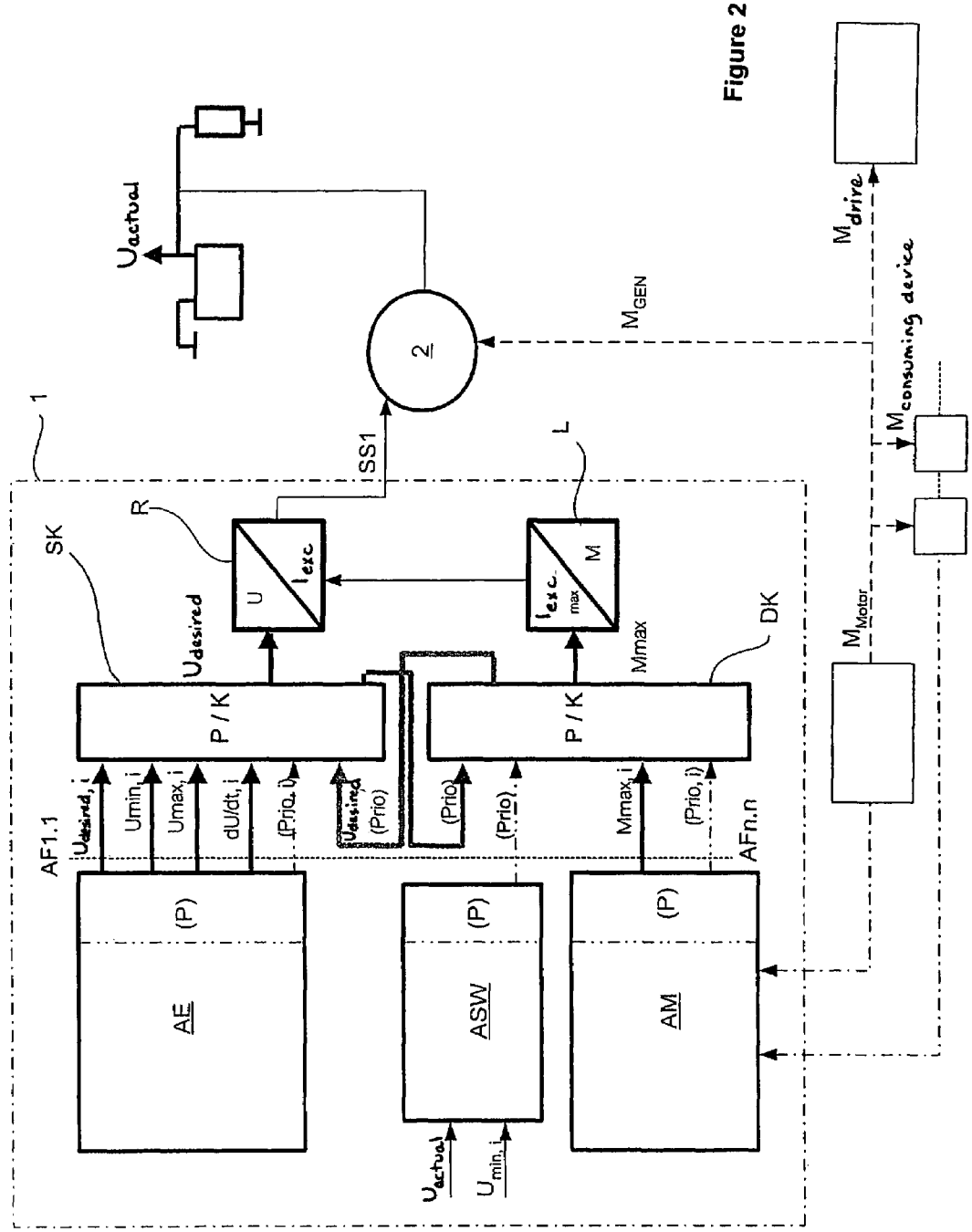
FIG. 2 is a schematic diagram of an embodiment of a system according to the invention.

FIG. 2 illustrates a system 1 for controlling and/or regulating an electric machine 2 of a motor vehicle in a particularly preferred embodiment. Here, the electric machine 2 is preferably constructed as a generator. Of course, the present invention includes embodiments in which the electric machine is constructed as a machine operated only as a generator, only as a motor, or as both a generator and a motor (for example, as a so-called crankshaft starter generator).

By way of an interface SS1, the generator 2 is controlled by the system 1 (in the following called the control system) integrated, in particular, in an engine timing unit. The individual components or functionalities of the control system 1 may also be arranged in a distributed manner in several different control devices. The control system 1 preferably includes different demand units AE, AM, ASW. The illustrated embodiment has three demand units AE, AM, ASW. By way of a first demand unit AE, demands are made to the generator 2 which are of an electrical type. These are, for example, electrical demands of the onboard power supply, such as demands for charging the battery or demands of electrical consuming devices (such as voltage demands in the form of minimal voltages and/or maximal voltages for the rear window heater, the seat heater, electrical window lift mechanisms, the radio, or the like). By way of a second demand unit AM, demands on the generator 2 are generated which are of a mechanical type, such as torque demands on the basis of an automatic idling control, as a result of the compensation of starting weaknesses by reducing the generator torque or as a result of the activation of auxiliary systems (such as the air-conditioning system, oil pumps, the alternator and the like), coupled with the transmission line. Finally, a third demand unit ASW in the form of a voltage monitor is present. The voltage monitor monitors the generator output with respect to its output voltage via a comparison of the actual voltage $U_{actual}$ (generator output) with a voltage limit in the form of minimum voltage $U_{min}$ (generator output), below which the voltage should not fall.

By way of the different demand units AE, AM, ASW, one or, as required, isochronously several demands AF1, . . . , AFn are transmitted to a coordination unit. The coordination unit preferably includes a voltage coordinator SK as well as a torque coordinator DK. The voltage coordinator SK and the torque coordinator DK contain prioritization devices P by which different priorities can be assigned to the demands AF1, . . . , AFn on the generator 2, as well as coordination devices K by which it is ensured that, in the event of an isochronous occurrence of several demands AF1, . . . , AFn, the higher priority demand is in each case treated, processed, or transmitted to the generator 2 in a higher-ranking manner. As an alternative, the prioritization devices P can also be contained in the respective demand units AE, ASW, AM and, by way of the coordination unit, only the actual coordination of the already prioritized demands can take place. In each case, the voltage coordinator SK contains a type of pre-coordination of the desired generator voltage $U_{desired}$, while the torque coordinator DK contains a pre-coordination for the exciting current limitation. Both pre-coordinations are mutually coordinated with respect to the priority, so that the highest priority of the overall system is always treated in a higher-ranking manner or is transmitted to the generator for adjusting the desired generator voltage.

In the following, the method of operating the system according to the invention will be explained in detail by way of an embodiment. When, for example, by means of demands AF1.1, AF1.2, AF1.3, the desired generator voltage $U_{desired,i}$ desired by a subscriber, the minimal generator voltage $U_{min,i}$ of a subscriber I, and the maximal generator voltage $U_{max,i}$ of a subscriber i (FIG. 2) are transmitted to the voltage coordinator SK, the demands in the voltage coordinator SK are first prioritized by the prioritization devices P (a priority is assigned to them). In this case, for example, priority 50 is assigned to demand AF1.1; priority 60 is assigned to demand AF1.2; and priority 70 is assigned to demand AF1.3. Furthermore, there is another demand AF1.x having priority 30 (see also FIG. 3).

Figure 3:
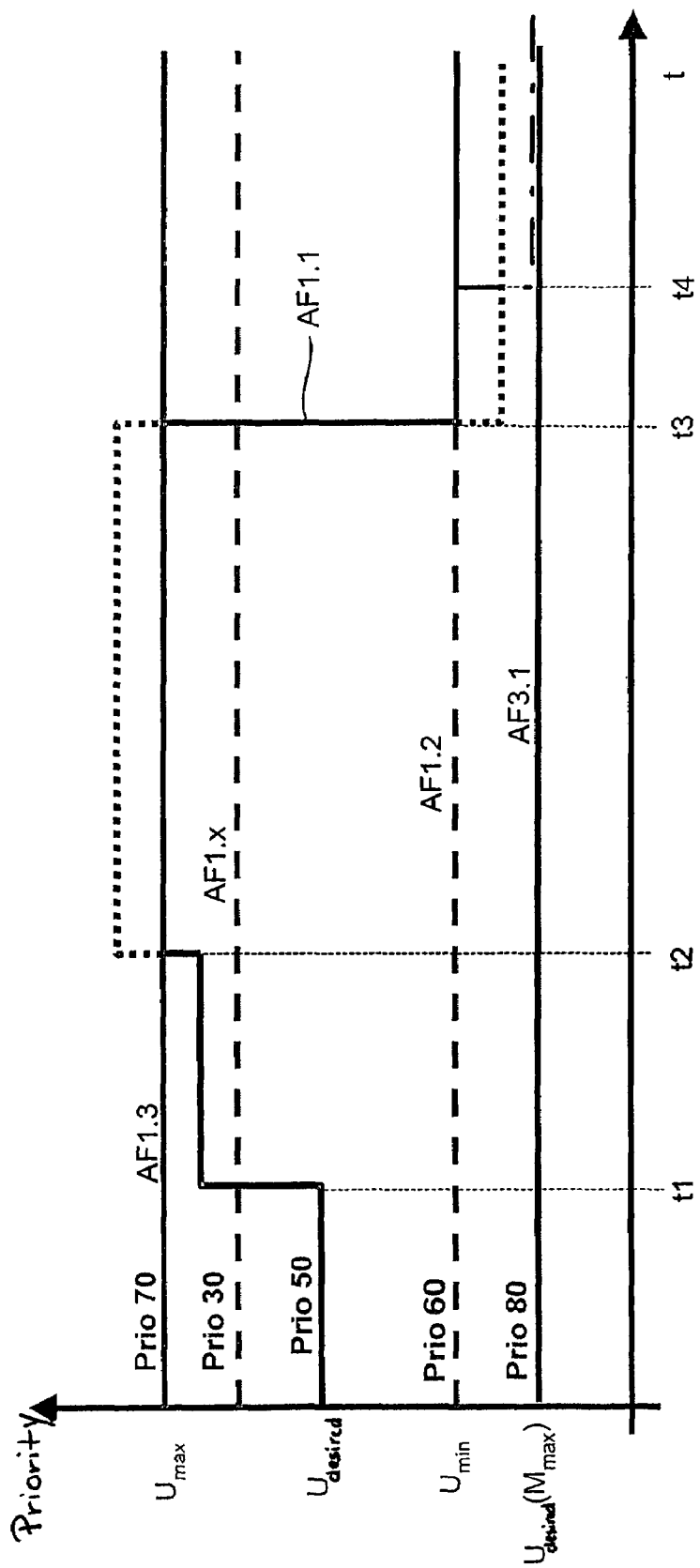
FIG. 3 is a graph of the method of operation of the system according to the invention as an example of coordination by way of a voltage coordinator.

Subsequently, by way of the coordination devices K, the demand with the highest priority is determined and is, in each case, processed in a higher-ranking manner, in that the desired generator voltage $U_{desired}$ with the highest priority is transmitted by way of an interface SS1 to the automatic generator controller R and the latter adjusts the demanded desired generator voltage $U_{desired} = U_{actual}$ at the generator output. FIG. 3 further illustrates this process by the numerical values. Demand AF1.1 with the desired voltage $U_{desired}$ of a subscriber is prioritized, for example, by the priority value 50. Depending on the predefinition, the desired voltage according to demand AF1.1 can rise or fall and, in the process, ignore voltage limits of a lower priority, whereas the desired voltage would be limited by voltages limits of a higher priority. In FIG. 3, at the point in time t1, by way of $U_{desired}$, for example, a demand AF1.x (here: voltage limit) of a priority 30 is ignored, whereas, at the point in time t2, the, in turn, rising desired voltage $U_{desired}$ is limited by another demand AF1.3 (additional voltage limit) of a higher priority (priority 70) to the thereby predefined voltage limit $U_{max}$. Finally, at a point in time t3, the decreasing desired voltage $U_{desired}$ is also limited downward by another demand AF1.2.

Furthermore, by way of the torque coordinator DK, an equivalent prioritization and coordination can take place.

If demands occur at the voltage coordinator SK as well as at the torque coordinator DK, the respective demands are each pre-coordinated and are finally mutually coordinated, so that again only the demand of the overall highest priority is treated in a higher ranking manner.

When an increase of the driving torque is demanded (AF3.1), for example, by the engine timing unit and when this increase is to take place by reducing the generator torque acting upon the transmission line, the demand unit AM can transmit a corresponding demand to the torque coordinator DK (here, with a correspondingly high priority), so that, by way of the coordinating devices K of the torque coordinator DK, a corresponding torque demand $M_{max}$ is generated.

In a first embodiment, a maximal exciting current $I_{exc.max}$ is assigned to this torque demand $M_{max}$ by way of a logic L and, for limiting the exciting generator current, this exciting current $I_{exc.max}$ is transmitted to the automatic generator controller R, whereby the generator 2 (while the desired voltage predefinition for the generator continues to be unchanged) is correspondingly reduced, and thus a reduced generator torque is transmitted to the transmission line. In this case, there is a risk that, as a result of the reduced actual generator voltage, the onboard power supply is supplied with an insufficient voltage for an undesirably long time period. In order to avoid the above, by way of the voltage monitor ASW demand unit, the actual onboard power supply voltage $U_{actual}$ is compared with a minimal onboard power supply voltage $U_{min,i}$ and, when the predefined lower voltage limit ($U_{min,i}$) has been reached, a signal is generated, which has a priority increased in comparison to the priority assigned to the torque demand $M_{max,i}$, and is transmitted to the torque coordinator. The limitation of the exciting generator current is thereby raised, and the onboard power supply is again supplied with a generator voltage corresponding to the demands.

In a second embodiment for meeting a torque requirement which results in a reduction of the generator torque, a direct predefinition of the desired generator voltage by a separate voltage predefinition (without a limitation of the exciting current predefinition prioritized on the basis of the automatic controller hardware in comparison to the voltage predefinition) can also take place with a corresponding assigned priority (desired voltage definition from the torque coordinator DK on the basis of a torque demand $M_{max,i}$ to the voltage coordinator SK—see broken line $U_{desired}$, (prio)). This process is illustrated in FIG. 3, in which case it is assumed that the demand AF3.1 (desired voltage predefinition on the basis of a torque demand with the goal of torque reduction of the generator onto the transmission line) occurs with priority 80 at the point in time t4. As a result of the demand AF3.1 having the highest priority, at the point in time t4, the desired generator voltage, and thus the generator torque loading the transmission line, is reduced according to the torque demand, and a desired generator voltage $U_{desired}(M_{max})$ corresponding to demand AF3.1 is adjusted.

The prioritization devices P are advantageously constructed in the form of a table (priority table) stored in a memory area. A priority is assigned to each demand of the overall system. In this case, each priority is preferably different and also exists only once, so that a one-to-one sequence of the occurring demands AF1, . . . , Afn is ensured. As an alternative thereto, the prioritization devices may also be constructed in the form of software, by which, via predetermined rules, priority is assigned to each occurring demand online.

In a particularly preferred embodiment of the invention, the assignment of the priorities can be changed. The assignment in a table or the rules for the online prioritization can, therefore, be changed by an authorized user.

The above-described method of operation of the system according to the invention was aimed at an embodiment in which the prioritization of the demands takes place in the respective coordination unit SK, DK. In an equivalent embodiment, the demands can also already have been prioritized in the demand units arranged upstream. In this case, only the coordination of the demands will still take place in the coordination unit. For this reason, separate priority demands from the demand units are provided with parentheses in FIG. 2 and pertaining action arrows are illustrated in a dash-dotted manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for controlling and/or regulating an electric machine of a motor vehicle, the system comprising:
    a plurality of prioritization devices by which different priorities are assigned to demands on the electric machine;
    one or more coordination devices receiving the prioritized demands; and
    wherein when more than one prioritized demand occurs isonchronously, the one or more coordination devices treating in a higher-ranking manner the prioritized demand having a higher priority, and wherein the assignment of the different priorities to the demands is variable.

2. The system according to claim 1, wherein the one or more coordination devices include at least one of a torque coordinator for coordinating different torque demands and a voltage coordinator for coordinating different voltages demands.

3. A system for controlling and/or regulating an electric machine of a motor vehicle, the system comprising:
    a plurality of prioritization devices by which different priorities are assigned to demands on the electric machine;
    one or more coordination devices receiving the prioritized demands; and
    wherein when more than one prioritized demand occurs isonchronously, the one or more coordination devices treating in a higher-ranking manner the prioritized demand having a higher priority, wherein only one priority is assigned to each demand, each assigned priority being present only once in the system.

4. The system according to claim 3, wherein the plurality of prioritization devices comprise storable tables in which a priority is assigned to each defined demand.

5. The system according to claim 3, wherein the prioritization devices comprise software for determining priority for each demand online.

6. A method for controlling and/or regulating an electric machine of a motor vehicle, the method comprising the acts of:
    assigning, via prioritization devices, different priorities to a plurality of demands on the electric machine;
    coordinating the plurality of demands having the different priorities via coordination devices, wherein a respective demand with a highest priority is dealt with first if several demands occur simultaneously, wherein the act of assigning the different priorities is variable.

* * * * *